April 28, 1931.  F. S. DAVIS ET AL  1,803,099
RIGID FRAME DOUBLE CRANKING MOTOR GRADER
Filed Oct. 29, 1926   2 Sheets-Sheet 1
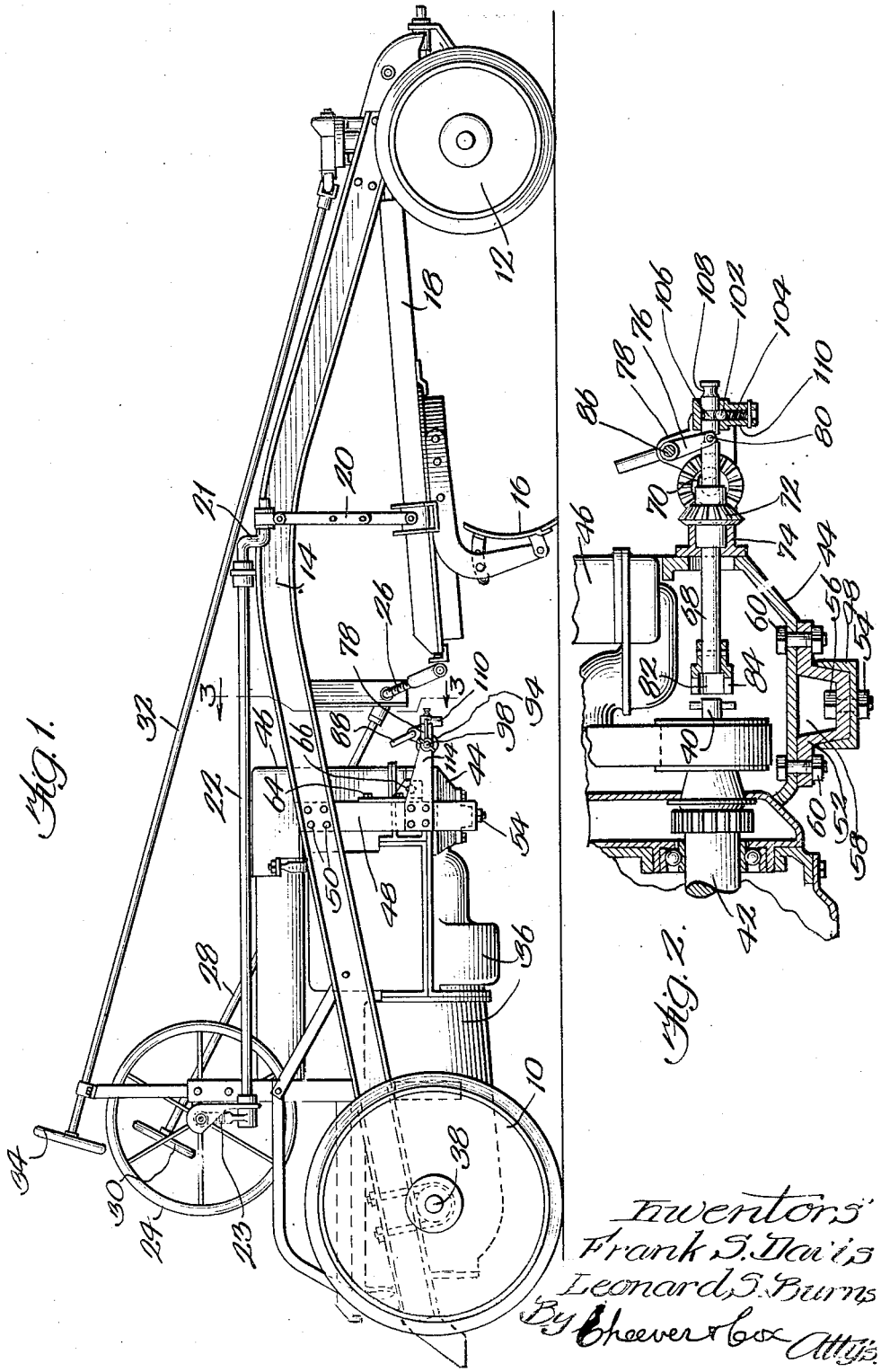

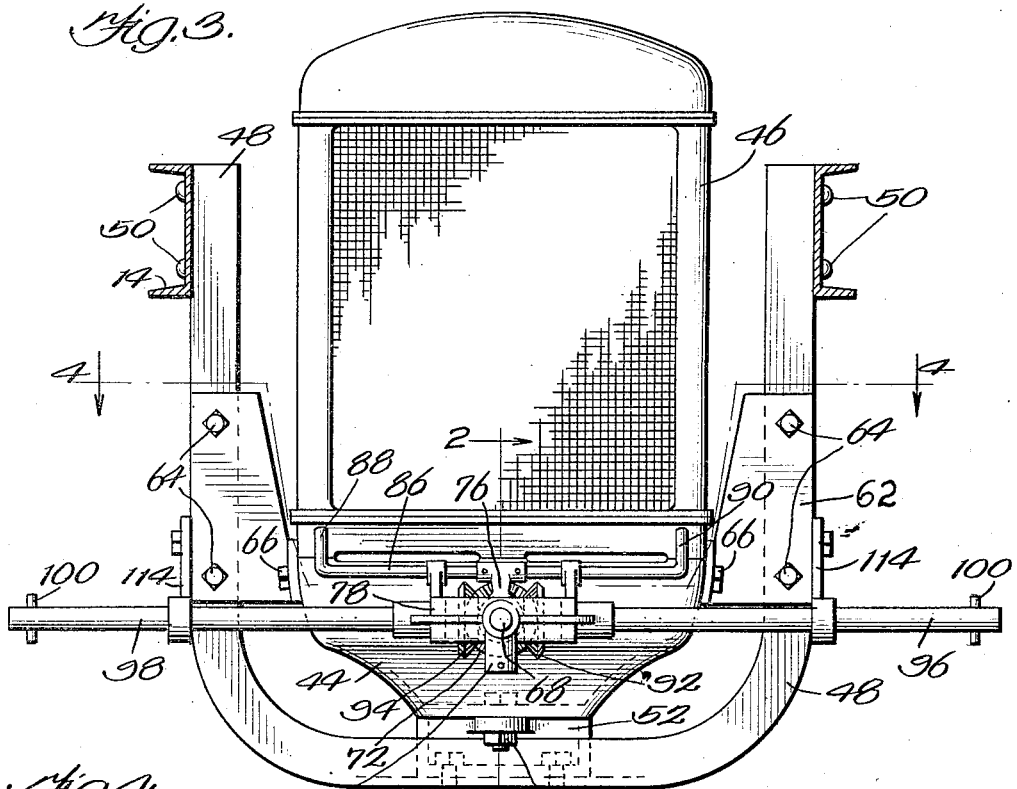
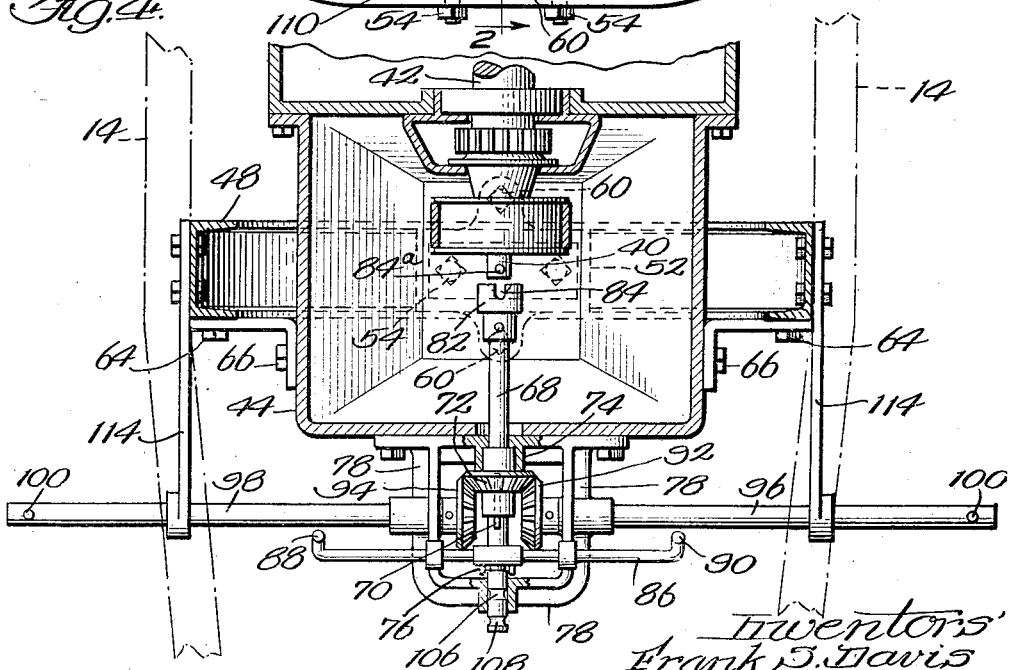

Patented Apr. 28, 1931

1,803,099

UNITED STATES PATENT OFFICE

FRANK S. DAVIS, OF HOMEWOOD, AND LEONARD S. BURNS, OF HARVEY, ILLINOIS, ASSIGNORS TO AUSTIN MANUFACTURING CO., OF CHICAGO, ILLINOIS, A CORPORATION OF ILLINOIS

RIGID-FRAME DOUBLE-CRANKING MOTOR GRADER

Application filed October 29, 1926. Serial No. 144,978.

This invention relates to motor graders, especially those of the now more or less familiar one-man manipulatable type in which the engine or power plant is so rigidly attached to the grader frame mechanism that the engine and the frame cooperatingly assist each other.

The objects of the invention are to provide an improved form of securing the engine rigidly to the frame and for conventionally cranking the engine when so secured, the cranking mechanism including means by which cranking may be effectively performed from either side of the device.

The first above mentioned object is more particularly to so connect the front end of the tractor with the main frame or side rails of the grader that the objectionable lateral rocking of the frame relative to the tractor is eliminated, and in this connection it is worthy of note that in machines of the one man type utilizing a tractor as the propelling means, there is, generally speaking, no advantage taken of the rigidity of the tractor body to strengthen and stabilize the grader frame against twists caused by unequal thrust applied through such members as 20, here illustrated. This thrust when severely applied at the end of such crank arm as here illustrated by 21 causes a tendency of the frame to sway sideways, which is successfully resisted by the present invention.

The invention consists in means carrying out the foregoing and other objects, which can be easily and cheaply made, which is highly efficient and not readily liable to get out of order.

More particularly the invention consists in numerous features and details of construction hereafter more fully set forth in the specification and claims.

Referring to the drawings in which like numerals designate the same parts throughout the several views:

Figure 1 is a side elevation of mechanism illustrating this invention in its preferred form.

Figure 2 is a side detail view of the cranking mechanism taken on the line 2—2 of Figure 3.

Figure 3 is a front view of the engine taken on approximately the line 3—3 of Figure 1.

Figure 4 is a plan detail view of the irregular line 4—4 of Figure 3.

The invention is shown applied to a road grader of conventional form including rear wheels 10, front wheels 12 and connecting frame 14, carrying intermediate between the wheels the road working tool 16 below supplemental frame 18, adjustable through crank shaft mechanism 20—21—22 and 23 manipulatable by hand wheels 24 in conventional manner.

This tool 16 is also further adjustable in conventional manner by the mechanism 26—28 adjustable by the hand wheel 30. The grader is conventionally steerable through the shaft mechanism 32 adjustable by wheel 34.

The grader is driven by engine power plant 36 including at its rear end transmission shaft 38 on which rear wheels 10 are mounted. The engine 36 also includes main shaft 40—42 which has to be initially rotated or cranked by mechanism of this invention. The front or crankable end of this shaft lies within a suitable case 44 constituting the front end of the power plant case.

One of the problems of this invention is to secure the forward end of the power plant rigidly to the frame 14 of the tractor. In the preferred embodiment of the invention, this is accomplished by suspending the forward end 46 in a U-shaped frame 48 rigidly secured to frame 14 by any suitable means as for instance rivets or bolts 50, the engine case 44 being rigidly secured to said U-shaped frame 48 through mechanism to be described. The device includes a channel shaped horizontally disposed casting 52 of such size and shape that it enters and tightly fits the channel shaped section of the U-shaped frame 48 as clearly shown in Figure 2, being rigidly secured in place by a multiplicity of bolts 54 placed at points some distance apart along the bottom of member 48, the heads 56 of the bolts 54 being within hollow interior 58 of the casting 52. The member 52 is in turn secured to the bottom of case 44 by a multiplicity of suitably disposed bolts 60. The forward end 46 of the engine mechanism 36 is further secured to the U-frame 48 by heavy bracket member 62 located well down on the frame 48, secured to said frame by bolts 64 and to the engine by bolts or lag screws 66. The result of the foregoing is that the forward end of the engine is rigidly held in the frame 48 under all conditions of strain upon the device.

The U-shaped frame 48 just described extends so far beyond the sides of the engine 36 and is longitudinal of the machine so close to cranking end 40 of the drive shaft 40—42 that special means has to be provided accessible from the side of the machine for effecting cranking of the shaft end 40 and it is preferably desirable to provide means for so cranking the shaft and consequently the engine from either side of the grader as the will of the operator may dictate. A further important reason for the double cranking device is the fact that it is not always possible because of the diagonal position of the blade to apply a crank at a certain side of the machine. For instance, sometimes the motor is overloaded and "dies" with the blade deep in the ground and practically immovable diagonally. This invention includes mechanism which will now be described which overcomes the above difficulties.

Slidably mounted through the wall of case 46 and in alignment with shaft end 40 is a short shaft 68. This shaft carries a spline 70 reciprocal through a beveled gear 72 journaled in a suitable bearing casting 74 on the end of case 44 whereby rotation of said bevel gear 72 rotates shaft 68 in all positions of its longitudinal movemnt through the end of case 44. Shaft 68 is reciprocal through the agency of a short lever 76 rigid on shaft 86 journaled in stationary bearing 78, the lower end of the crank being operatively attached to the shaft 68 in a conventional mechanism 80, permitting the lever 76 as it rocks in a clockwise direction, as viewed in Figure 2, to move shaft 68 to the left until a conventional chuck 82 on its left hand end engages shaft end 40 and pin 84ª thereon, the pin slipping into the notch 84 in the chuck in conventional manner to thereby transmit rotation of shaft 68 to shaft 40—42. Lever 76 is rockable by corresponding movement of shaft 86, heretofore referred to, which, as clearly shown in Figure 3 extends a substantial distance toward each side of the machine, there being provided upwardly turned handle ends 88 and 90, selectively graspable by an operator on either side of the machine, as the case may be, to manually rock said shaft 86 and thus in the manner described effect operative connection or disconnection, as the case may be, between the clutch or chuck 82 and the shaft end 40.

Beveled gear 72, heretofore referred to, is selectively drivable by either one of two bevel gears 92 and 94 each mounted on its independent shaft 96 and 98, respectively, suitably journaled in the frame 78 which, as shown in plan view in Figure 4, entirely surrounds the gear mechanism 72, 92—94. Each of these shafts, as clearly shown in Figure 4 extend outside the frame 14 and are there engageable by ordinary cranks applied to the pins 100 for rotation to effect cranking of the tractor engine. Obviously, when the operator rotates one shaft as 96, the other shaft 98 will idly rotate, and vice versa, but this is unobjectionable.

By the construction described, we have rigidly secured the engine in the frame mechanism of the tractor and have provided readily accessible cranking means operable from either side of the tractor.

The shaft 68 is frictionally held in either position to which it moves in the operation of cranking shaft 40 through the agency of a vertically movable ball 102 urged by a spring 104 into either one of two notches 106 and 108 adjacent to the end of shaft 68, the ball and spring being confined and vertically movable in a suitably provided case 110 on the extreme outer end of frame 78.

It is obvious that should occasion occur, two operators on opposite sides of the machine may simultaneously operate the shafts 96 and 98 to effect cranking of the engine.

The rigidity of connection between U frame 48 and side frame 14 makes it possible to effectively journal shafts 96 and 98 on brackets 114 to thereby obtain steady supports for said shafts 96 and 98 with consequent efficient cranking of the main engine shaft.

Having thus described our invention, what we claim as new and desire to secure by Letters Patent is:

1. In combination with a tractor engine case and side frame member extending longitudinally thereof, on opposite sides thereof, a U-shaped frame embracing the case, means rigidly securing the ends of the U frame to the side frame, means rigidly bracing the engine to the U frame near the base of the U frame and means rigidly securing the engine to the base of the U frame at a multiplicity of points along said base, said last mentioned mechanism including a supplemental casting of channel shape, interposed between the engine case and U frame and bolted to each, the heads of the bolts connecting the U frame and casting being in a space inside the casting.

2. In mechanism of the class described in combination with an engine case, its longitudinal shaft to be cranked, and side frame member extending longitudinally thereof on opposite sides thereof, a U-shaped frame embracing the case, means rigidly securing the ends of the U frame to the side frame, means rigidly bracing the engine to the U frame near the base of the U frame, a shaft extending crosswise of the side frame supported intermediate its ends to the U frame, means operatively connecting said shaft to the shaft to be cranked and manually operable means for rotating the second shaft to crank the first shaft.

In witness whereof, we have hereunto subscribed our names.

FRANK S. DAVIS.
LEONARD S. BURNS.